May 10, 1932.    P. KOLLSMAN    1,857,311
INDICATOR
Filed Dec. 10, 1931    2 Sheets-Sheet 1

INVENTOR
Paul Kollsman
BY
Mio Shumacher
ATTORNEY

May 10, 1932.   P. KOLLSMAN   1,857,311
INDICATOR
Filed Dec. 10, 1931    2 Sheets-Sheet 2
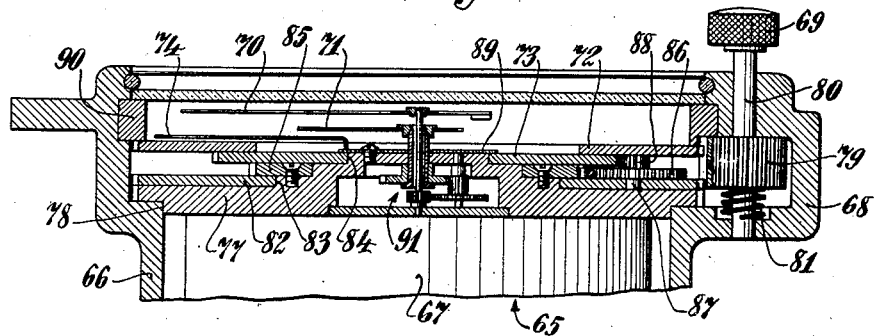
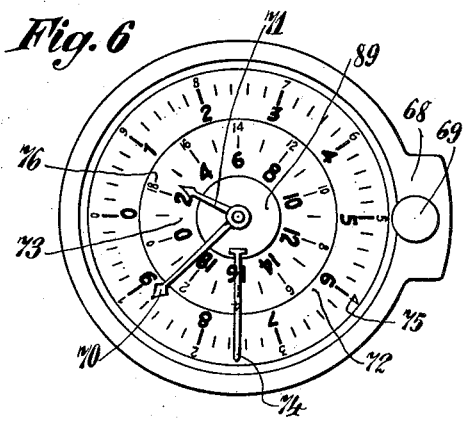
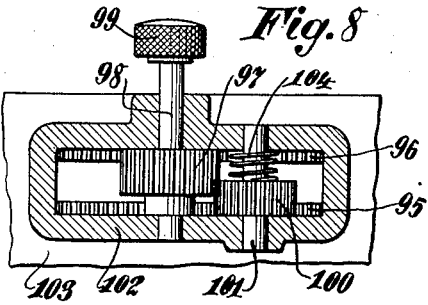
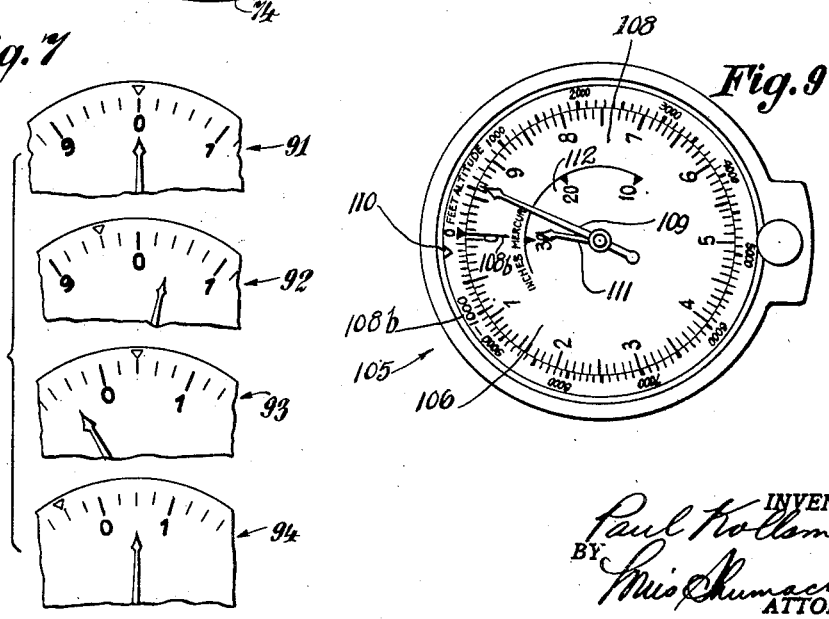
INVENTOR
Paul Kollsman
BY
ATTORNEY Patented May 10, 1932

1,857,311

UNITED STATES PATENT OFFICE

PAUL KOLLSMAN, OF WOODHAVEN, NEW YORK

INDICATOR

REISSUED

Application filed December 10, 1931. Serial No. 580,119.   APR 9 - 1940

This invention relates to indicators.

One object of the invention is to provide an instrument having pointer and reference means having an improved coordination which may be characterized in that the sum of the setting changes in their respective indications is zero, this improved arrangement being applicable regardless whether the reference means be in the form of a mark or scale, and irrespective of the nature of the pointer means as fulfilling an indicating function; differently stated, the pointer, reference means and scale are moved relatively to each other in such a manner that the pointer and reference mark in effect move in opposite directions relatively to a zero or other initial mark on the scale. For purposes of illustration, this may be accomplished by moving the pointer and reference means in opposite directions with respect to a relatively stationary scale, or by moving the scale and either the reference means or pointer in the same direction but to a greater degree or twice the angular distance of the scale.

By the arrangement above noted, the use of the instrument and the reading thereof is greatly simplified. For example, if pointers and reference means are moved in the same direction, it is necessary to have a plurality of scale indicia so that the scale indication of the reference means may be subtracted from that of the pointer means. The provision of a plurality of scale indicia tends to fill up the instrument dial and to render observation of the same confusing and tiresome. If the scale indicia for the reference means be omitted, then it is necessary for the observer to mentally subtract the reading of the reference means from that of the scale means.

To demonstrate the clear advantage that results from an arrangement whereby the pointer, reference means and scale have such interrelative movements that the pointer and reference means are in opposed relations to the zero mark of the scale, it may be assumed that an aviator is flying at an altitude of 1000 feet and desires to land. He may obtain the barometric pressure at the field, as by radio message, and hence obtain the corresponding numeral in feet altitude, which may be assumed to be 200 feet. Now he sets the reference mark at 200 feet, causing the pointer to move relatively oppositely from 1000 feet to 800 feet, which is the elevation of the aviator above the field. It will be noted that while the reference means moves to indicate the positive figure of 200 feet, the pointer means moves negatively to an equal degree so that the changes cancel each other, indicating the net result.

By moving pointer and reference marks as above indicated, the dial may be held stationary during setting, so as to avoid shifting the positions of the indicia.

Another object of the invention is to provide an altimeter having a barometric scale and a scale graduated in feet, the pointers and their corresponding reference means being moved in different degrees and so that the changes in the readings vary in opposite direction and in such manner as to cancel each other and amount to zero on the basis of altitude barometric pressure equivalency.

Another object is to provide improved dial arrangements which are easy and convenient to read and observe; for instance a plurality of concentric scales following the decimal system; or wherein the pointers or reference means are movable in the ratio of 1 to 10, for ordinary indicating and also for setting action if desired, preferably with coincidence at the common zero of the scales.

Another object of the invention is to provide an improved indicator including means for rotating the indicator and its associated parts relative to a casing or supporting means therefor so as to bring one of a plurality of the pointers into a position for indicating a desired condition and hence the occurrence of any deviation therefrom; for example, if the instrument is to be used to indicate level flight, then the indicator may be turned to move the large pointer, when the required altitude is attained, to extend horizontally, and therefore if the altitude increases or decreases the pointer moves correspondingly upward or downward.

Another object is to provide a device of the nature set forth including a plurality of pointers and reference means together with improved means for causing a setting movement of the instrument to change the scale indications or a movement of the pointer operating mechanism together with the pointer, and reference and scale means so that the instrument indications are unchanged, and a pointer is brought into a desired condition indicating relation.

Another object of the invention is to construct an improved indicating instrument having improved means for adjusting the relation between the reference, pointer, and scale means, in a convenient and reliable manner.

Another object of the invention is to provide an instrument having improved co-ordinating and drive means so as to readily accomplish the foregoing objects in various combinations, and which drive means is simple in construction, comparatively inexpensive to manufacture, durable, reliable, and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Fig. 5 is a fragmentary central vertical sectional view showing another modification of the invention.

Fig. 6 is a plan view on a reduced scale of the device shown in Fig. 5.

Fig. 7 is a diagrammatic view showing fragments of dials in plan view and different relationships of pointer, scale and reference means.

Fig. 8 is a fragmentary sectional view showing details of a further modification.

Fig. 9 is a plan view showing a modified indicator dial.

Figure 1:
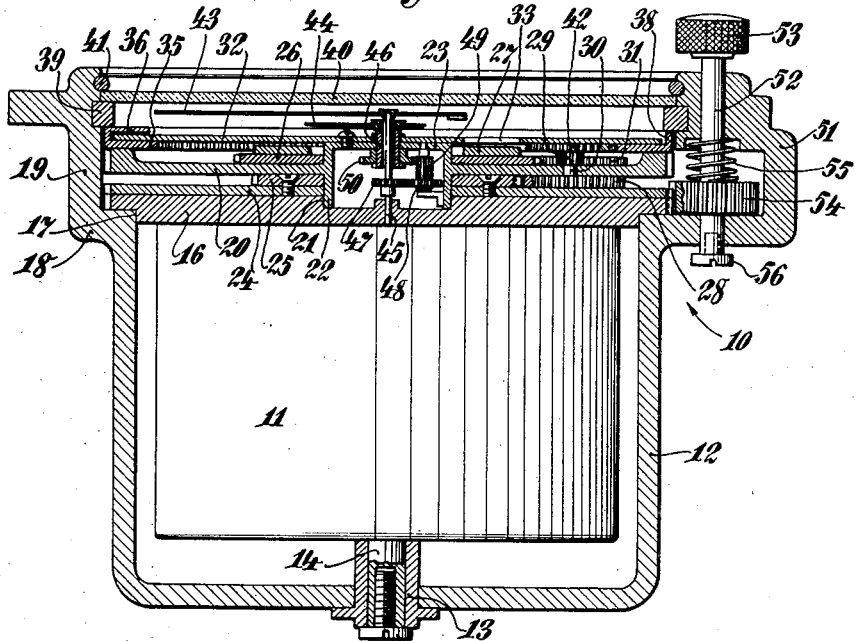
Figure 1 is a view in central vertical section showing a device embodying the invention.

The advantages of the invention as here outlined are best realized when all of its features and instrumentalities are combined in one and the same structure, but useful devices may be produced embodying less than the whole.

It will be obvious to those skilled in the art to which this invention appertains, that the same may be incorporated in several different constructions. The accompanying drawings, therefore, are submitted merely as showing the preferred exemplification of the invention.

This invention is applicable to altimeters, tachometers, and indicators for stress, flow, air speed, and the like.

The ideal instrument, especially in the case of altimeters, has a plurality of pointers, one for sensitivity and the other for range. These pointers are associated with reference and scale means to facilitate setting the instrument as against a certain condition with respect to which indicator readings are desired. Preferably the reference reading occurs in such manner that it is automatically subtracted or added to the indicator reading as the case may be. This relation may be practised in connected with scales one or both of which may be graduated in feet altitude or in inches of barometric or other similar or equivalent units. In either case and as long as there is a common basic relationship between the scales, equivalent changes in the readings of both scales is desirable in such manner that one change is positive and the other negative. If the changes in readings were of similar sign, it would be necessary to subtract a proposed change in setting, mentally or otherwise, as by pencil and paper, before setting the device. The barometric scale may of course be associated in any suitable relation with the altitude scale. In any case, both scales may have a common equivalent initial point. This, for the altitude scale may be zero, as at sea level, and for the barometric scale, a pressure corresponding thereto. Both scales are preferably concentric. Moreover, a plurality of concentric altitude scales may be used or a single altitude scale which may be common to both pointers, and even to the reference means if desired. Such scale may be graduated according to a decimal system, or else the pointers, reference means may be movable relative to each other in a ratio such as one is to ten or any multiple thereof. These pointers and reference means may have a coinciding position at a zero or initial point of a plurality of the scales, since this together with the one to ten ratio of movement defines an inherent characteristic in the improved simplified arrangement of my instrument. The ideal indicator includes a proper combination of the above elements with a characteristics whereby it is rotatable relative to its casing or mounting, so that the larger pointer may extend for instance horizontally to afford a direct level flight indication and without changing the relationships between the pointers, scales, and reference means so that the readings are the same. After a period of use, the indicator sometimes fails to indicate correctly, possibly due to a slight change in condition of the indicator operating means and adjustment is necessary. The adjustment may consist in that the normally synchronous rate of change in setting of pointer and reference indications can be varied to effect the desired adjustment. For example, a relative adjusting movement may be caused between the scale means and either the reference or pointer means. This can be readily effected, since, according to my invention, an associated, unitary or single means may be brought into play to selectively cause said adjustment, or to set the instrument readings, or to set the instrument in the condition indicating position without changing the readings. The adjusting means is preferably ordinarily locked to avoid accidental operation thereof, since the various parts of the instrument might otherwise be thrown out of synchronized relation so that the instrument would have to be given a laboratory adjustment and might be useless until then.

Referring in detail to the drawings, 10 denotes a device embodying the invention. The same may include an indicator having suitable operating means or mechanism, all conventionally denoted by 11, and which may be responsive to any desired measurable condition, such as barometric pressure. For this mechanism or indicator 11, any support or casing 12 may be provided which is adapted to be mounted preferably stationarily on an instrument board. Rotatably supporting the indicator in the casing are any suitable means including, for instance, a hub 13 secured to the rear of the casing, in which hub a stub shaft 14 of the indicator may be journaled and retained by a screw 15. At the front of the indicator, a flange or disc element 16 may be provided, which is preferably in the nature of a gear fixed to the indicator, as in concentric relation therewith. This gear may have a circular portion or recess 17 affording a bearing engagement with the casing at an angular portion thereof, whereby an annular enlargement 19 is afforded for receiving the toothed part of the gear.

Associated with the gear 16 is a gear 20 which may be concentric and of equal diameter with the gear 16 and may be rotatable relatively thereto. This gear 20 may be mounted in a suitable manner, preferably on the support or gear 16. Thus the latter may have a bearing portion or recess 21, and the gear 20 may have a portion or hub 22 journaled therein. Said hub 22 may be in the form of a cylinder and may have an end wall 23. For the purpose of externally mounting certain drive elements as hereinafter disclosed, the hub 22 may be said to constitute a hollow shaft.

Journaled on the member 22 is a gear 24 which may be disposed alongside of the gear 16, and is of equal diameter and having teeth similar to those of the gear 16. Secured to the gear 24 in concentric relation therewith is a gear 25 which may lie alongside the gear 20. Also journaled on the shaft 22 on the opposite side of the gear 20 is a gear 26 which may be somewhat larger in diameter if desired than gear 25. This gear may carry a reference or scale means 27.

Interconnecting the gears 25 and 26 is a gear train including pinions 28, 29 rotatably concentrically mounted at 30 on gear 20 at opposite sides thereof. The pinion 28 engages gear 25 and pinion 29 may engage a gear 31 which in turn engages the gear 26, whereby relative rotation may be caused between the gears 20 and 26. Since a dial 32 is fixed relative to gear 20, as at the portion 23 thereof, and this dial having a window 33 through which the reference scale 27 may be observed, it will be clear that by providing a reference mark 34 on the dial at said window, the reference means 27, 34 is capable of producing different readings.

Between the dial 32 and gear 20 may be provided an internal gear 35 for carrying a reference mark or means 36, if desired, and which may co-operate with a circular scale 37 on the dial 32. This gear 35 may slidingly rest against a peripheral flange of the gear 20, and may itself have a flange 38 retained as by a resilient split locking ring 39, that may also afford a base for a glass 40 which may in turn be locked by a split ring 41 in a well known manner.

For rotating the gear 35, a pinion 42 may be secured on the shaft 30 to rotate as a unit with pinions 28, 29, this pinion 42 engaging the internal gear 35.

One or more indicating means, such as a long pointer 43 and a short pointer 44 may be properly mounted for rotation in different degrees by the indicator. The pointer 43 may be secured on a spindle 45 which extends freely through the support 16 and through a hollow shaft 46 journaled in an opening in the wall 23 and dial 32, and which shaft 46 carries the pointer 44. Interconnecting shafts 45, 46 is a gear train including a gear 47 secured on shaft 45, and engaging a gear 48 having a concentric pinion 49 engaging a gear 50 secured on the shaft 46. The axis of the gears 48, 49 is thus fixed relatively to the gear 20.

Formed at a part of the circular casing enlargement 19 is an extension 51, through which may slidingly extend a shaft 52 that is journaled in the spaced walls of the extension, and said shaft having an external knob 53 for manual rotation of the same. Fixed on the shaft, is a drive element or pinion 54, the teeth of which are adapted to mesh with those of any or all of the gears 16, 20, 24 according to the axial position of the pinion. Extending around the shaft is an expansion coil spring 55 tending to move the pinion inward. A movable locking means such as a removable set screw 56 may be secured to the shaft 52, the head of the screw serving normally as a stop for engaging the casing 51 and limiting the movement of the pinion 54.

The operation of the device will now be briefly described. In the position shown in Fig. 1, and with pinion 54 in engagement with gears 16 and 24, the device is adapted to be set with reference to a particular condition, or barometric pressure; that is, the pointers 43, 44 and reference means 27, 36 are moved in synchronism and in their proper varying degrees. This position of the instument may be conveniently termed the reference setting position. By pulling on the knob 53 until the screw 56 stops further movement, the pinion 54 engages all three gears 16, 20 and 24. By turning the knob 53, the dial 32 is turned together with gear 20 as a unit with the indicator 11, so that there is no relative rotation of the pointers or reference means, but all of these parts move as a unit without any change in the readings. In this manner the instrument may be set with the pointer 43 having a directional condition indicating position, as, for instance, horizontally, to aid in the maintenance of level flight. Therefore this second position may be denominated as the condition maintenance position, in contradistinction to the reference setting position. The third position of the pinion 54, requires that the set screw 56 shall be removed so that the pinion may move out of engagement with the gears 16 and 20, and engage only the gear 20. When the knob is now turned, a relative movement is caused as between the dial 32 and reference means 27, 36. This may be caused by a stationary relation of the gear 24 as by frictional engagement in any suitable manner with the gear 16 or otherwise, and hence rotation of gears 26 and 35 is caused, so that the respective reference means 27 and 36 move relatively to the dial 32. The indicator 11 being stationary, the pointers 43, 44 are not affected. Hence this operation of the device may be utilized mainly for setting or adjusting the reference means, as in the event that the instrument should be inaccurate because of a change in the indicator 11. This third position may be called the adjusting position. After it is completed, the screw 56 is replaced to avoid accidental retraction to the third position, since the latter, if inadvertently used, may result in throwing the instrument parts entirely out of their proper relations.

It will be noted that the adjusting means may be omitted merely by removing gear 24 and securing the gear 25 directly to gear 16, or by fixedly interconnecting gears 16, 24.

The drive means herein described has an especial advantage in that the knob 53 may be used for causing the operations or the positions corresponding thereto for all three actions above described. It will be observed that the reference means 27, 36 move in opposite directions relative to pointers 43, 44 in the reference setting operation, this being of particular advantage for the reference means 36, and of lesser advantage for the reference scale means 27. The sum of the changes for the reference means 36 and its corresponding pointer is zero, since the movements are in equal degree, and one being in a positive and the other in a negative direction. Under standard conditions as of temperature and pressure, the sum of the actual readings of pointer and reference means in feet altitude would be zero. The reference means 36 may be graduated, in the case of an altimeter, either in feet or in inches of mercury for corresponding barometric pressure. Hence the instrument may be directly set without requiring that the barometric pressure be converted into feet.

Figure 3:
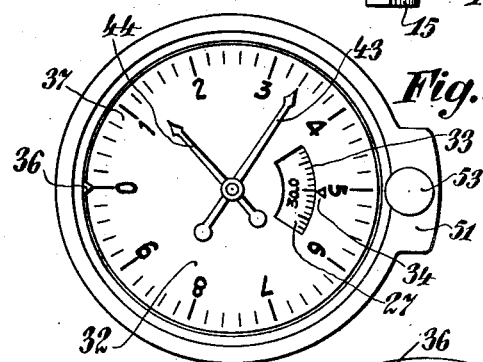
Fig. 3 is a plan view of the instrument shown in Fig. 1 but on a reduced scale.
Figure 2:
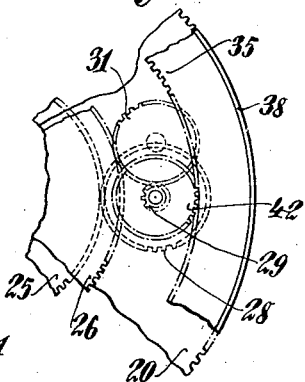
Fig. 2 is a fragmentary front view of a detail of the drive mechanism.
Figure 4:
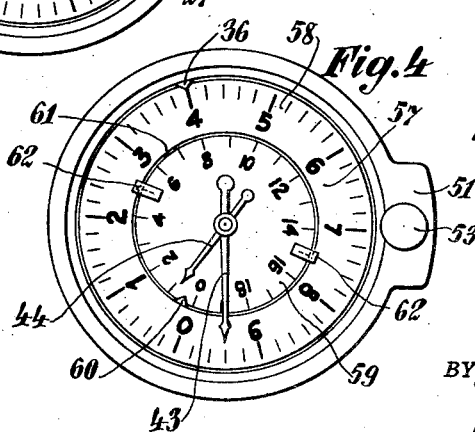
Fig. 4 is a plan view of a modified instrument showing a different dial and the instrument being set for reference indicating and condition maintenance positions.

A practical use of the instrument for altimeters is well illustrated in Fig. 4. Assume that an aviator is flying at an elevation of 1340 feet, as shown, for example, in Fig. 3. He is passing over a country 400 feet high and desires to maintain this elevation and ultimately to land on that country. He moves the knob 53 in the first position until reference means 36 is at 4. The pointer 43 moves in opposite direction to the reference means, from 1340 to 940. The knob may now be moved outward to the second position so as to rotate the dial, pointers, reference means, and indicator until the pointer 43 extends horizontally, thus obtaining the view shown in Fig. 4. If the aviator flies higher or lower the pointer 43 moves correspondingly up or down. Moreover, the pointer now indicates elevation above the country. The same results may be obtained by utilizing barometric pressures. Moreover, the reference setting and the condition maintaining functions of the instrument may be advantageously practised independently of each other.

It will be perceived that the dial in Fig. 3 illustrates a scale which is graduated according to the decimal system, there being ten numerals, and a rotation of pointer 43 being indicative of 1000 feet of altitude, while a rotation of the pointer 44 indicates 10,000 feet of altitude. It is seen that a single scale with a single set of indicia thus suffice for both pointers, making the reading of the dial easy and convenient to accomplish. According to Fig. 4, the dial 57, corresponding to dial 32 may have a plurality of concentric scales 58, 59, the scale 58 being similar to that shown in Fig. 3 and the scale 59 being graduated for 20,000 feet. Here the indicia for scale 59 may be comparatively small, while the indicia for the scale 58 are large and prominent. In effect the indicia for the latter scale may also serve for scale 59.

In place of the reference means 27, a reference means 60 may be used in Fig. 4, this being preferably movable along a slot 61 in the dial corresponding to window 33. The inner and outer sections of the dial may be fixed interconnected as by one or more narrow preferably transparent bridge pieces 62 arching across the slot 61, so that the reference means 60 may pass thereunder, or the outer dial section may be separately connected in any suitable manner to the gear 20.

In Figs. 5 and 6 is shown a modification of the invention including an instrument 65 having a casing 66 for containing an indicator 67 and associated parts thereof. The casing may have a circular enlargement and an extension 68 for housing a means that is operative by a setting knob 69. The instrument may have one or more pointers 70, 71 and a plurality of scales 72, 73. These scales may also take the form of reference pointers as hereinbefore shown. Preferably a combined scale and reference means is utilized, as, for example, by utilizing a relatively stationary reference means 74 with respect to which the scales 72, 73, or reference scales such as 75, 76 may be movable. In the specific case shown, I have preferred to show pointed scales and reference scales, and the latter may be associated in unitary or fixed relation to the former. As shown, a single reference mark 74 may be used as an element of both reference means. In order to set this instrument with respect to a certain condition or elevation, the scales such as 72, 73 are rotated in relatively different degrees with respect to the reference means 74, and according to the graduations of the scales. The instrument may also be set for indicating a position the maintenance of which is desired, as will now be described.

The indicator 67 may be rotatably mounted in the casing 66 as by a support or gear 77 journaled in the casing at 78. This gear is engageable by a pinion 79 fixed on a rotatable slidable shaft 80 to which the knob is secured. Retaining the pinion 79 normally out of engagement with the gear 77 is an expansion coil spring 81.

For rotatably mounting the gears 73, 82 of the setting mechanism, the support or gear 77 may have stepped bearing portions 83, 84 on which the said gears may be journaled. The outer gear 82 may be engaged with the pinion 79. Fixed to the member 77 is a gear 85 which may form a bearing portion for gear 82. The gear 85 may engage a gear 86 that is mounted by means of a shaft 87 on the gear 82. Centrally secured to the gear 86 is a pinion 88 that engages the dial gear 73.

The latter may have a part of its bearing provided by a disc 89 centrally fixed to the member 77, and which may carry the reference means 74. The outer dial 72 may also be in the form of a gear, and may be engaged by the pinion 79. The gear 72 may be journaled in any suitable manner, as by being slidingly positioned between the gear 73 and a split expansion ring 90, and may also be suitably fitted in the casing.

The gear train 91 interconnecting the shafts of the pointers 70, 71 may be the same as that hereinbefore shown, except that its action is somewhat different in that the support 77 is non rotatable relative to the casing. Hence the pointers are movable only by or with the indicator 67.

The operation of this device will now be briefly described. In the reference setting position shown in the drawings, the dials are turned by the knob 69, in different degrees, without turning the indicator so that the positions of pointers and reference means are unchanged. Thus the device may be set to indicate in the same general manner as the device 10. For example, assume that the aviator flies at an elevation of 7130 feet, and desires to land on a field in fog or at night. He obtains the barometric pressure at the field and finds that it corresponds to 4250 feet. He sets his dials by rotating knob 69 until the reference means 74 is at numeral 4250 feet on the reference scale means 76, and at 250 feet on the reference scale means 75. Hence his pointers show an elevation of 2,880 feet above the field. Setting and observation of the instrument requires attention to four scales. It will be noted that the change in readings occur in the same direction for both pointer and reference means as against the opposite directions hereinbefore specified. Also that the sum of the changes in setting for pointers and reference means is zero.

If the instrument is to be used for directional indication of a desired condition, the knob 69 may be pushed inward so that pinion 79 may engage all three gears 77, 82, 72, so that the device may be turned until pointer 70 extends, for example, horizontally, if the maintenance of level flight is desired at the elevation of 2880 feet or any other elevation to which the instrument may be set.

Having considered the above arrangements of dial, pointer and reference means, so that the advantages of the preferred form are clearly apparent, I will briefly discuss further possible arrangements, in connection with the diagrams of Fig. 7. 91 denotes an initial position for any arrangement. 92 denotes the arrangement of Figs. 1 to 4, with pointer and reference means moving in opposite directions. In 93, dial and pointer are shown moving in the same direction with respect to a reference means, but the pointer moving at a greater or at twice the speed of the dial. In 94 the dial and reference means are shown moving in the same direction with respect to a pointer, and the reference means moving through an angle twice that of the dial. In both 93 and 94 the effect produced is basically the same as in 92, since the pointer and reference means are on opposite sides of the zero mark of the dial and in effect move oppositely thereto. The form shown in 92 is superior, however, since the dial is stationary so that the numerals are not moved in setting. This is particularly advantageous if the numerals read vertically, as they generally do. But even if the numerals are radially arranged in my preferred manner, it is still generally desirable to maintain the numerals in their usual positions.

In Fig. 8 are shown details of the invention whereby adjustment between a reference means and a dial may be secured, in substantially the same manner as shown in Fig. 1, but without shifting the knob such as 53. In this illustration, the indicator rotating gear may be 95, and the reference means rotating gear may be 96. The former may correspond to gear 16 and the latter to either 20 or 35. A pinion 97, corresponding to 54, may be mounted on a shaft 98 to be turned by a knob 99. The pinion may be in engagement with gear 96 and with the pinion 97, the latter being also in engagement with a pinion 100, the teeth of which may be in mesh with those of the gear 95. The pinion 100 may be fixed on a shaft 101 journaled in the walls 102 of an extension of the indicator casing 103. An expansion coil spring 104 may extend around the shaft 101. By exerting an axial force on the shaft 101, the pinion 100 may be moved against the force of the spring 104 out of engagement with gear 95. Hence by turning the knob 99, the reference means may be moved without turning the indicator, so that the relationship of these parts and hence of the reference means to the dial may be adjusted. Upon releasing the shaft 101, the gears reengage so that the desired relationship of reference means and indicator is always maintained. It will be understood that the shaft 101 may be made quite small and inconspicuous and may have its operative end disposed inwardly, against an instrument panel board, or the like, so as to ordinarily inaccessible. The device of Fig. 8 may be used in the instrument shown in Fig. 1.

It will be noted that while the reference means 74 is single in its nature, it may also be considered as having a dual character as a plurality of reference means, in connection with the different scales.

The term indicating means may be used herein to denote a combination of scale and pointer or scale and reference means, or all three together, and with the reference means being the equivalent of a scale that may be used for reference.

In Fig. 9 is shown a device 105 having a modified indicator dial 106 which may be advantageously used in barometers and altimeters. This dial may include a barometric scale 107 reading in suitable units such as inches of mercury, and an altitude scale 108 that may read in feet altitude, both scales being arranged to show the equivalency as between altitude and barometric pressure. The scales are graduated to increase in opposite directions. At 108a is a line for indicating the normal pressure at sea level. At 108b is an indicia to read for altitudes below sea level. Associated with the scales, there may be provided a pointer 109 operated by a suitable pressure responsive means, and a rotation of this pointer may be equal to 1000 feet of altitude, and the corresponding change in inches of mercury. Both readings may be taken simultaneously, the device being of particular advantage in an instrument that is adapted to be set to a required altitude according to the principles of the invention. Thus by taking a barometric pressure reading, the device may be directly set as by moving the pointer or other reference means 110, without requiring that the barometric pressure be first converted into feet altitude. If desired, an additional pointer 111 may be provided following a reference means or scale 112 that may read in inches of mercury. As shown in the drawings, the instrument indicates a reading of 29.35 inches of mercury, and an altitude of 550 feet.

It will be appreciated that various changes and modifications may be made in the device as shown in the drawings, and that the same is submitted in an illustrative and not in a limiting sense, the scope of the invention being defined in the following claims.

I claim:

1. The combination with an indicator having an operating means, an indicating means controlled thereby, a scale means and a reference means, of a setting means for the indicating, scale and reference means arranged to cause a movement therebetween such that the indications vary in opposite directions in equal degrees.

2. An indicator including pointer means, a scale means therefor, reference means, and setting means for causing a relative movement between two of the aforementioned means with respect to the third means such that the sum of the changes in the indications of the pointer and reference means on the scale means is zero.

3. An indicator including a pointer means, a reference means, a scale having indicia increasing in the same direction, and setting means for moving the pointer means and reference means in opposite directions in synchronized relation with the scale and the indicia thereof.

4. The combination of an indicator having a pointer means, a reference means, a scale graduated in units of altitude for the pointer means, and a barometric pressure scale for the reference means, means to cause a relative movement between the pointer means and its scale and a corresponding equivalent movement of the barometric pressure scale relative to the reference means.

5. An indicator including scale means, pointer means, reference means, operating means for the pointer means, and control means including means for causing a relative movement between scale, pointer and reference means such that the indications of the pointer and reference means increase in opposite directions and the sum of the changes in the respective scale indications for the pointer and reference means is zero, and said control means including means for causing a movement of scale, pointer, reference and operating means so that the indicator will assume a directional condition indicating position.

6. An indicator including pointer means, operating means therefor, scale means, reference means, and common means for moving at will the pointer and reference means relatively to the scale means, and the pointer, reference, scale and operating means as a unit so that the indicator denotes a condition to be maintained.

7. The combination with an instrument having a casing, indicating means including scale, pointer and reference means, and operating means for the indicating means, of means for displacing the indicational relation between the pointer, scale and reference means, and for moving the indicating and operating means relatively to the casing while maintaining the scale, pointer and reference means in releasably interlocked relation.

8. A device including a casing, a plurality of scale means, a plurality of pointer elements, a plurality of reference means for the individual pointer elements, one of said pointer elements being different than the other so as to be adapted to positionally refer to a condition to be maintained, operating means for the pointer elements, and common means to cause a relative movement in different degrees between the pointer elements, reference means, and scales, and to cause a movement of the pointer elements, scale, and reference and operating means relative to the casing so that the pointer element that is different will indicate said condition.

9. An indicator including a plurality of pointer means, operating means for actuating the pointer means in different degrees, scale means, reference means for the individual pointer means, an actuating means for causing a relative movement in different corresponding degrees between both reference means and pointer means, and one of the reference means being so co-ordinated with the actuating means and its respective pointer and scale means as to cause the sum of the changes in the individual scale indications for the pointer and reference means to be substantially equal to zero.

10. The combination with an indicator, a casing, reference means, a plurality of pointer and scale means, of actuating means for moving the different scale means in different degrees for setting the device, and means coacting with said actuating means whereby a movement as a unit can be caused of the indicator, reference, pointer and scale means relative to the casing.

11. A device including an indicating means including a plurality of indicating elements, and a single setting means for moving said elements in different degrees or for moving the indicating means into condition indicating position without changing the set position of the elements.

12. A device including the combination with an indicator having scale, reference, and pointer means, of actuating means for setting the pointer and reference means relatively to the scale, adjusting means for changing the relation between the scale means and one of the reference and pointer means, while maintaining constant the relation of the scale means and the other one of the pointer and reference means, and a common means for causing operation of the actuating and adjusting means together or one of these units alone for causing individual setting or adjustment of the device.

13. An indicator having a plurality of pointers, a dial means therefor, means for moving the pointers in the ratio of one to ten, and a reference means, the dial means and reference means being movable relatively to each other in setting, the dial means including a plurality of dials movable relatively to each other in the ratio of one to ten in setting, at least one of the dials having a scale for the pointer and a scale for the reference means, and said scales increasing in opposite directions.

14. An altimeter having a plurality of pointer means, a scale means for the pointer means, an actuating means to cause indicating movements of the pointer means in the ratio of one to ten, and the pointer and scale means being so co-ordinated that both pointer means produce a zero indication on the scale means with the pointers coinciding with each other, a reference means, the scale and reference means being movable relatively to each other in setting, and setting means for causing a relative movement between the pointer, reference and scale means such that the pointer and reference indications vary in opposite directions in equal degree relatively to the scale means.

15. A device including reference means, scale means, pointer means, setting means to cause a relative movement therebetween, and means for causing a relative adjusting movement between the scale means and one of the reference, and pointer means, while maintaining constant the relation of the scale means to the other one of the pointer and reference means.

16. A device including a casing, an indicator, reference, scale and pointer means, actuating means for moving the indicator, reference, scale and pointer means relative to the casing, a second actuating means for causing a relative movement between the reference means and scale means alone, and other means for selectively operating either the first or second mentioned means.

17. A device including a casing, an indicator, reference, scale and pointer means, operating mechanism including actuating means for moving the indicator, reference, scale, and pointer means as a unit relative to the casing, said operating mechanism including means for causing a relative setting movement between the pointer, scale, and reference means alone, said operating mechanism including means for causing a different relative movement between the reference, pointer and scale means for adjustment, said operating mechanism including a single means for selectively operating the first, second, and third mentioned means.

18. A device including a casing, an indicator, pointer, scale and reference means, actuating means for causing a relative movement between the scale means and one of the reference and pointer means, a second actuating means for moving the indicator, pointer and scale means relative to the casing, and a unitary means for operating the first or both actuating means.

19. A device including a casing, an instrument therein including pointer, scale, and reference means, and operating means including actuating means for causing a relative movement between the scale and one of the reference, and pointer means while maintaining fixed the relation of the scale to the other one of the reference and pointer means, a second actuating means for causing a relative movement between reference, scale, and pointer means, a third actuating means for moving said instrument relatively to said casing, said first actuating means including a single means removable therefrom for selectively engaging and operating the second or third actuating means.

20. An indicator including scale, pointer, and reference means, means for causing a relative movement between pointer, scale, and reference means including actuating means individually operative for causing a relative movement between the scale means and only one of the reference and pointer means, and positive means for preventing individual operation of the actuating means.

21. An altimeter including an indicator means, pointer, scale, and reference means, actuator means for causing a relative movement between the scale means and the indicator means, and reference means, said actuator means including a drive having a plurality of interengaging elements, manual means for controlling the drive, said drive including an element that is separately manually movable out of engagement with the other elements of the drive so that a relative movement may be caused between the indicator means and reference means alone by actuation of only one of the last mentioned means.

22. A device including an indicator, supporting means rotatably mounting the same, a unitary means rotatably associated with said supporting means, said unitary means including an actuating means and scale, pointer and reference means co-operating with said actuating means for movement thereby, a second actuating means movable with the indicator and operatively associated with the first actuating means, and other means for rotating the indicator alone or the indicator together with the said unitary means, whereby when the indicator alone is turned the first and second actuating means interact to cause a movement between pointer, scale, and reference means.

23. A device including an indicator, supporting means rotatably mounting the same, a unitary means rotatably mounted on said supporting means, said unitary means including an actuating means and scale, pointer and reference means co-operating with said actuating means for movement thereby, a second actuating means movable with the indicator and operatively associated with the first actuating means, and other means for rotating the indicator alone or the indicator together with the said unitary means, whereby when the indicator alone is turned the first and second actuating means interact to cause a movement between pointer, scale, and reference means.

24. A device including a pressure sensitive indicator having a rotory pointer, means rotatably supporting the indicator, and an actuator unit rotatably mounted on the supporting means in concentric relation with the indicator, said unit including a reference means rotatably carried thereby, and a scale non rotatably carried by said unit.

25. A device including an indicator, means supporting the same, and a unit rotatably carried by the supporting means, said unit including an indicating means including a plurality of elements relatively movable to each other, one of said elements being stationary with respect to said unit.

26. A device including an indicator, means supporting the same, actuator means including a member rotatably associated with the supporting means, a spindle operated by said indicator extending into said member, an indicating means rotatably carried by said member, means mounted on said member and interconnecting the spindle and the indicating means, and means to cause a relative movement between the indicator and actuator means for operating the indicating means.

27. A device including an indicator, pointer means movable in different degrees, a plurality of separate scales for the respective pointer means movable relatively to the indicator, actuating means for moving the scales in different degrees independently of the indicator, said actuating means including a manual control means, and other actuating means releasably engageable by said manual control means so that the indicator and scales are rotatable as a unit in relatively stationary relation to each other.

28. A device including a casing, an indicator, scales therefor movable in different degrees, and means for displacing said scales in different degrees relatively to the indicator, or for concomitantly moving said scales and indicator in equal degrees relative to the casing.

29. A device including an indicator, a casing therefor, a plurality of indicating means movable in different degrees, with the indicator and one of the indicating means being movable relatively to each other for reference setting of the indicating means, and means movable for causing the setting of the indicating means, or for moving the indicator and indicating means as a unit and in equal degrees relative to said casing.

30. A device including an indicator, a casing therefor, a plurality of pointer means, a plurality of refernce means, scale means, means for causing either a relative movement in different degrees between scale, pointer and reference means, including a relative movement between the indicator and scale means, or a movement as a unit of the indicator, reference, scale and pointer means relative to the casing.

31. An indicator having a plurality of pointers, a plurality of reference means, a common scale means, means for moving the pointers in different degrees in the ratio of one to ten to each other, and means for causing a relative setting movement between pointers, scale, and reference means in the same ratio.

32. A device including a plurality of pointer elements, scale means for the pointer elements, said scale means having a common initial point, an indicator for moving the pointer elements in a ratio of one to ten to each other, the pointer elements and scales being so arranged that both pointer elements coincide with the common initial point when the slow moving pointer element is at said point, and reference means, the scale means and reference means being movable in the ratio of one to ten relatively to each other in setting the device.

33. A device including a plurality of pointer means, reference means corresponding thereto, a plurality of scales for the pointer means and the reference means, an indicator for moving the pointer means in different degrees, and means for causing a relative setting movement between the pointer means, scales and reference means, the pointer means, scales and reference means being so arranged that the indications of the pointer means and the reference means are zero under standard conditions of altitude and barometric pressure.

34. The combination of an indicator, a plurality of pointer means actuated by the indicator in different degrees, a reference means, a barometric pressure scale for the reference means, a scale means for the pointer means, a setting means to cause changes in different degrees in the indications of the different pointer means and to cause a relative corresponding equivalent movement between the reference means and the barometric pressure scale such that the changes in the indications of pointer and reference means are positive and negative in character.

35. An indicator having a plurality of pointer means, an actuating mechanism to cause indicating movements of the pointer means in the ratio of one to ten, and setting means to cause changes of the indications of the pointer means in the ratio of one to ten.

36. An indicator having a plurality of pointer means, a reference means, scale means, indicating means to cause indicating movements of the pointer means relative to each other in the ratio one to ten, and setting means to cause changes in the indications of the pointer means in the ratio of one to ten and to cause a simultaneous change of the indication of the reference means.

37. An altimeter having a scale, an indicator, a plurality of pointers movable in the ratio of one to ten by the indicator, said pointers being coordinated with said scale, and the indicator and scale being rotatable relatively to each other.

38. An altimeter including an indicator, a plurality of pointers movable in the ratio of one to ten by said indicator, a common scale for both pointers, said pointers being operative by the indicator so as to coincide at the zero point of the scale at sea level, and reference means associated with said scale, and setting means for causing changes in the indications of the pointers in the same ratio and a simultaneous synchronous change of the reference means.

39. An indicator having a plurality of pointer means, an actuating means for moving the pointer means in the ratio of one to ten, a scale means, a reference means, and setting means for causing a synchronous setting movement between the pointer, scale and reference means such that the sum of the changes in the indications of the pointer and reference means on the scale means is zero.

40. An indicator having a plurality of pointer means, an actuating means for moving the pointer means in the ratio of one to ten, a common scale means, a reference means, and setting means for causing a setting movement between pointer, scale and reference means in the one to ten ratio and such that the pointer and reference indications vary in opposite directions in equal degrees.

41. An altimeter having an indicator responsive to changes in atmospheric pressure, a common altitude scale means having a zero point, a plurality of pointers movable by the indicator in the ratio of one to ten, and the pointers coinciding at the zero point of the common scale means at sea level, and setting means for causing a change in the indications of the pointers in the same ratio with the scale means and indicator moving relatively to each other.

42. An indicator having an indicator actuating means, pointer means operated thereby, altitude scale means for the pointer means, and reference means, characterized in that the pointer means includes a plurality of pointers movable in the ratio of one to ten, a barometric scale for the reference means, and means to cause a relative setting movement between the scale means and the pointers in the same ratio and a corresponding equivalent movement between the reference means and the barometric scale.

43. An altimeter including an indicator responsive to changes in atmospheric pressure, a plurality of pointers movable thereby in a ratio of a multiple of one to ten, and concentric altitude scales for the individual pointers graduated in a common direction according to a like ratio, said scales having a common zero position, and the pointers coinciding with each other at said zero position at sea level altitude at standard barometric pressure, reference means associated with at least one scale and its pointer, and a common means for causing a change in the indications of the pointers according to said ratio and with the reference means producing a change in reference indication in opposite direction to that of its associated pointer.

44. An altimeter including a casing, an indicator therein having a plurality of pointers movable thereby in the ratio of one to ten, a common scale for the pointers having a zero point, the pointers being operative by the indicator to coincide with each other at said zero point at a pressure corresponding substantially to sea level altitude, and means to cause a rotary movement of the indicator, pointers and common scale relative to said casing.

45. An altimeter including an indicator having a plurality of pointers movable thereby in the ratio of one to ten, a dial having a common scale for the pointers, reference means, a barometric scale at the face of the dial for the reference means, and setting means for causing the indications of the pointers to move according to said ratio and the indication of the reference means with the barometric scale to change synchronously therewith.

46. An altimeter having an indicator, pointer means including a plurality of pointers movable thereby in the ratio of one to ten, reference means, a common scale for the pointer and reference means, and setting means to cause the scale indications of the pointer and reference means to change in opposite directions relatively to each other with the pointers moving in the ratio of one to ten.

47. An altimeter including an indicator, a plurality of pointers, a dial having individual scales for the pointers, reference means for the dial, said dial and reference means and pointers being interrelatively rotatable for setting the altimeter, said scales having equally angularly spaced indicia and the corresponding indicia on the different scales being in alined radial relation with each other, each of said scales having ten indicia, the pointers being movable by the indicator in a ratio of a multiple of one to ten, and the scales being calibrated in correspondence with the movement of the respective pointers.

48. An altimeter including a casing, an indicator therein, a plurality of pointers, a dial having concentric individual scales for the pointers, and means for rotating the indicator, pointers and dial as a unit relatively to the casing so that one of the pointers will indicate a condition to be maintained, said scales having equally angularly spaced indicia and the corresponding indicia on the different scales being in alined radial relation with each other, each of said scales having ten indicia, the pointers being movable by the indicator in a ratio of a multiple of one to ten, and the scales being calibrated in correspondence with the movement of the respective pointers.

In testimony whereof I affix my signature.

PAUL KOLLSMAN.